(12) United States Patent
Forsberg et al.

(10) Patent No.: US 9,344,881 B2
(45) Date of Patent: *May 17, 2016

(54) IDENTIFIERS IN A COMMUNICATION SYSTEM

(75) Inventors: Dan Forsberg, Helsinki (FI); Valtteri Niemi, Helsinki (FI)

(73) Assignee: Vringo Infrastrct Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,390

(22) Filed: Sep. 13, 2012

(65) Prior Publication Data

US 2013/0003971 A1   Jan. 3, 2013

Related U.S. Application Data

(63) Continuation of application No. 11/769,621, filed on Jun. 27, 2007.

(60) Provisional application No. 60/816,740, filed on Jun. 27, 2006.

(51) Int. Cl.
*H04L 29/06* (2006.01)
*H04W 12/02* (2009.01)
*H04W 12/04* (2009.01)

(52) U.S. Cl.
CPC ........... *H04W 12/02* (2013.01); *H04L 63/0414* (2013.01); *H04L 63/0428* (2013.01); *H04L 63/06* (2013.01); *H04W 12/04* (2013.01)

(58) Field of Classification Search
CPC ..................................................... H04W 12/02
USPC .................................................. 380/247, 248
See application file for complete search history.

(56) References Cited

U.S. PATENT DOCUMENTS

| | | | |
|---|---|---|---|
| 5,455,865 A | 10/1995 | Perlman | |
| 5,889,861 A | 3/1999 | Ohashi et al. | |
| 6,144,949 A | 11/2000 | Harris et al. | |
| 6,373,949 B1 | 4/2002 | Aura | |
| 6,584,310 B1 | 6/2003 | Berenzweig | |
| 6,671,377 B1 | 12/2003 | Havinis et al. | |
| 6,674,860 B1 * | 1/2004 | Pirila | ........................... 380/247 |
| 7,233,664 B2 | 6/2007 | Soliman | |
| 7,406,594 B2 | 7/2008 | Taruguchi | |

(Continued)

FOREIGN PATENT DOCUMENTS

EP  0982958  3/2000
FR  2 724 796  9/1994

(Continued)

OTHER PUBLICATIONS

Office Action dated Sep. 4, 2015 issued in related U.S. Appl. No. 11/769,621.

(Continued)

*Primary Examiner* — Shawnchoy Rahman
(74) *Attorney, Agent, or Firm* — Cozen O'Connor (57) ABSTRACT

An identifier containing at least one encrypted part is received at a first network entity. A second network entity may then be determined based on the identifier. A request for assistance in decryption of the identifier from the second network entity may be sent from the first entity to the second network entity. The second network entity may then assist the first networks entity in an appropriate manner.

8 Claims, 6 Drawing Sheets

(56) References Cited

U.S. PATENT DOCUMENTS

| | | |
|---|---|---|
| 7,707,405 B1 | 4/2010 | Gilman et al. |
| 7,707,406 B2 | 4/2010 | Qiu |
| 2003/0236991 A1* | 12/2003 | Letsinger ................. 713/200 |
| 2004/0179690 A1 | 9/2004 | Soliman |
| 2005/0010774 A1 | 1/2005 | Rose et al. |
| 2005/0050318 A1 | 3/2005 | Alone et al. |
| 2005/0117747 A1 | 6/2005 | Valenti et al. |
| 2006/0143132 A1 | 6/2006 | Valenti et al. |
| 2006/0189298 A1 | 8/2006 | Marcelli |
| 2006/0189319 A1 | 8/2006 | Houldsworth et al. |
| 2006/0204003 A1 | 9/2006 | Takata et al. |
| 2006/0209843 A1* | 9/2006 | Zhang et al. ............ 370/395.32 |
| 2007/0101139 A1 | 5/2007 | Bayer et al. |
| 2009/0232312 A1* | 9/2009 | Inoue et al. ................ 380/278 |
| 2010/0014661 A1 | 1/2010 | Terekhova et al. |

FOREIGN PATENT DOCUMENTS

| | | |
|---|---|---|
| WO | WO 02/067486 | 8/2002 |
| WO | WO 2004021153 A1 * | 3/2004 |
| WO | WO 2004/030394 | 4/2004 |
| WO | WO 2006057248 A1 * | 6/2006 |

OTHER PUBLICATIONS

Office Action dated Feb. 5, 2015 issued in related U.S. Appl. No. 11/769,621.

Office Action dated Apr. 7, 2014 issued in related U.S. Appl. No. 11/769,621.

Office Action dated Aug. 29, 2013 issued in related U.S. Appl. No. 11/769,621.

Office Action dated Dec. 30, 2010 issued in related U.S. Appl. No. 11/769,621.

Office Action dated Jul. 7, 2010 issued in related U.S. Appl. No. 11/769,621.

* cited by examiner

IDENTIFIERS IN A COMMUNICATION SYSTEM

CROSS REFERENCE TO RELATED APPLICATIONS

This application is a continuation of U.S. patent application Ser. No. 11/769,621 which was filed with the U.S. Patent and Trademark Office on Jun. 27, 2007. This application claims the benefit of U.S. Provisional Application No. 60/816,740, filed Jun. 27, 2006.

BACKGROUND OF THE INVENTION

1. Field of the Invention

The invention relates to identifiers that are used in a communication system, and more particularly to identifiers that are at least partially encrypted.

2. Description of the Related Art

An identifier may associate with a communication device to identify either the device, the user thereof (the "subscriber") or both. A communication device is a device that is typically used for communication via a communication system. The communication device enables the users of the device to receive and transmit communication such as speech and data. A communication system can be seen as a facility that enables communication sessions between two or more entities such as the communication devices and/or other nodes associated with the communication system. Subscribers to a communication system may be offered and provided numerous services via their communication devices. Non-limiting examples of these services include two-way or multi-way calls, data communication or multimedia services or simply an access to a data communications network system, such as the Internet. The services may be offered by an operator of a network of the communication system or by an external service provider.

Examples of communication systems include fixed line communication systems, such as a public switched telephone network (PSTN), wireless or mobile communication systems, such as a public land mobile network (PLMN), and local area networks, fixed or wireless (e.g. LAN, WLAN and WiFi). In the mobile system, the users are allowed an access to the communication system via a radio access network. For example, in cellular and wireless local systems, a base station (BS) or similar access entity services a communication device via a wireless or air interface. The communication on the wireless interface between the communication device and elements of the access system is based on an appropriate communication protocol. The operation of the base station apparatus and other apparatus required for the communication can be controlled by one or several control entities. The various control entities may be interconnected.

A feature of the wireless communication systems is that they provide mobility for the users thereof. That is, the user may roam within the service area of his home network from an access network to the other. The users are also typically allowed to roam into other networks, thus enabling use of the communication device even when the user is not located within the service are of his/hers home network but is visiting another network.

Each network is typically provided with an entity for managing the mobility of the mobile users. The location of this entity depends on the standard and system. For example, in a General Packet Radio Service (GPRS) based communication network this can be provided in association with a signalling GPRS support node (SGSN). For clarity, and regardless of the used terminology of a particular standard and system, these entities will be referred to in the following by the term mobile management entity (MME). A mobile management entity of the home network is called in the following a home mobile management entity. A mobile management entity of the visited network is called in the following a visited mobile management entity.

One or more gateway nodes may be provided for connecting the network the user is using to other networks, for example to another mobile network, to a public switched telephone network (PSTN) and/or other communication networks such as an IP (Internet Protocol) and/or other data networks.

A communication device such as a mobile user equipment or a mobile station is typically provided with at least one permanent identifier. Non-limiting examples of the permanent identifiers include the international mobile subscriber identity (IMSI) and the international mobile equipment identity (IMEI). The IMSI is for identifying the user. The the international mobile equipment identity is for identifying the particular device.

An identifier is typically formed of a number of subsections or parts. For example, the international mobile subscriber identity (IMSI) currently consists of a mobile country code (MCC), a mobile network code (MNC) and a mobile subscriber identification number (MSIN). The total maximum length of an IMSI is currently 15 digits. Of the total, the MCC is 3 digits and MNC 2 or 3 digits depending on the area.

The mobile subscriber identification number (MSIN) part is for identifying the individual subscriber. Thus, from the subscriber's privacy point of view, at least this part of the IMSI should be protected all the time to prevent possibility of misuse of the possibly sensitive information.

An air interface in a radio access network is vulnerable to attacks, and therefore the parts containing sensitive information should not be communicated unprotected in the over-the-air signalling. For example, subscribers should be protected against tracking of plain text i.e. unprotected IMSIs or other identifiers.

On the other hand, the credentials of a subscriber cannot typically be fetched before the subscriber has been reliably identified by the network. For this reason there is typically provided a secure data storage facility at the home network of the subscriber for maintaining information about the subscriber, for example information that may used to interpret the contents of a MSIN part of an IMSI.

Certain radio access networks or other network elements are allowed to enquire from a user equipment for the permanent identity associated with the user equipment. This may be allowed, for example, for authentication purposes in case the network does not have any identity, for example a temporary identity for the user equipment. This leaves open a possibility that an attacker uses a tracker the to obtain the permanent identity. For example, an IMSI catcher are known to have been developed for this purpose. These are typically based on the realisation that it is possible for an attacker to create a false base station to which a user equipment then attaches to. The false base station may then inform the user equipment that it does not have any temporary identities of any sort for the user equipment, thus requesting a plain text IMSI from the user equipment (UE).

A network element can thus claim not to have the permanent identity of a user equipment (UE). An attacker may try to fool the user equipment by pretending to be an element of the network and ask the IMSI directly from the user equipment. The user equipment may have no option to deny the request, but will send the identity back in a non-protected format.

To illustrate this threat further, lets consider a case where a short range IMSI catcher is used together with some kind of user identification system, for example based on a credit card or similar. This enables an attacker to collect pairs of user identities and IMSIs. Attacker could also add IMSI catchers to certain locations to collect history of pass by IMSIs.

U.S. Pat. No. 6,373,949 discloses a way to protect the IMSI by encrypting the a mobile subscriber identification number (MSIN) part of the IMSI with a home operator public key. However, this still leaves a problem of protecting an IMSI that is send in clear text format over an air interface from a user equipment to the network. This type of transmission may be needed in occasions where the network does not know how to decrypt the encrypted MSIN part. In other words, an entity managing the mobility of a mobile user may not know where the secret key of the corresponding public key is located.

SUMMARY OF THE INVENTION

In accordance with an embodiment an identifier containing at least one encrypted part is received at a first network entity. A second network entity may be determined based on the identifier. A request for assistance in decryption of the identifier from the second network entity may be sent from the first entity.

In accordance with an embodiment there is provided a method comprising receiving an identifier containing at least one encrypted part at a first network entity, determining a second network entity based on the identifier, and requesting for assistance in decryption of the identifier from the second network entity.

An apparatus is provided in an embodiment, the apparatus being configured to receive an identifier containing at least one encrypted part, to determine a network entity based on the identifier, and to signal to the network entity a request for assistance in decryption of the identifier.

A more detailed embodiment further comprises receiving the identifier in a decrypted format at the first network entity from the second network entity. Information may be received from the second network entity for use in decryption of the identifier.

The receiving may comprise receiving the identifier at a mobility management entity of a visited network. The requesting may comprise requesting for decryption of the identifier from a mobility management entity of the home network of the identifier. The determining may comprise determining a mobility management entity of the home network of the identifier based on a network specific part of the identifier.

An embodiment further comprises receiving a public key and secret key pair along with a key identifier from the second network entity.

In accordance with another embodiment there is provided a method comprising receiving a request for assistance in decryption of an identifier containing at least one encrypted part, decrypting the identifier, and sending the decrypted identifier to the requestor. The receiving may comprise receiving at a mobility management entity of a home network the identifier from a mobility management entity of a visited network. The method may further comprise sending a public key and secret key pair along with a key identifier. The receiving of an identifier may comprise receiving an international mobile subscriber identity from a visited network.

The apparatus may comprise a mobility management entity of a visited network. The apparatus may be configured to determine a mobility management entity of the home network of the identifier based on a network specific part of the identifier. The apparatus may be configured to encrypt the identifier based on a key pair identifier of a public key and secret key pair. The apparatus may be configured to process an international mobile subscriber identity from a visiting user equipment.

According to a yet another embodiment there is provided an apparatus configured to receive a request for assistance in decryption of an identifier containing at least one encrypted part, to decrypt the identifier, and to send the decrypted identifier to the requestor. The apparatus may comprise a mobility management entity of a home network of a user equipment associated with the identifier. The apparatus may be configured to send a public key and secret key pair along with a key identifier to the requestor.

A system may also be provided, the system comprising a first network entity provided in a first network and a second network entity provided in a second network, wherein the first network entity is configured to receive an identifier containing at least one encrypted part and to receive from the second network entity assistance in decryption of the identifier, and the second network entity is configured to send said assistance to the first network entity.

In accordance with a yet further embodiment there is provided a communication device configured to send a message containing at least partially encrypted identifier and a identifier of a key for decryption of the at least partially encrypted identifier.

An embodiment provides a computer program comprising program code means adapted to perform a method comprising receiving an identifier containing at least one encrypted part at a first network entity, determining a second network entity based on the identifier, and requesting for assistance in decryption of the identifier from the second network entity when the program is run on a processor.

An embodiment provides a computer program comprising program code means adapted to perform a method comprising receiving a request for assistance in decryption of an identifier containing at least one encrypted part, decrypting the identifier, and sending the decrypted identifier to the requestor when the program is run on a processor.

The embodiments may provide a mechanism to improve the security in transmitting and processing identifiers.

It shall be appreciated that these issues are not limited to any particular communication environment, but may occur in any appropriate communication system.

Various other aspects, exemplifying embodiments and advantages are described in the following detailed description and in the attached claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Certain embodiments will now be described in further detail, by way of example only, with reference to the following examples and accompanying drawings, in which.

DETAILED DESCRIPTION OF THE PRESENTLY PREFERRED EMBODIMENTS

Certain embodiments for new mechanisms for processing at least partially protected identifiers will now be described by way of example with reference to an exemplifying mobile communication system. It is noted that the embodiments are examples only, and that the invention may be embodied in any other suitable form of a communication system. Also, although the following example is given in relation to identifiers such as the international mobile subscriber identity (IMSI) and the international mobile equipment identity (IMEI), the embodiments are also applicable to other identifiers.

Figure 1:
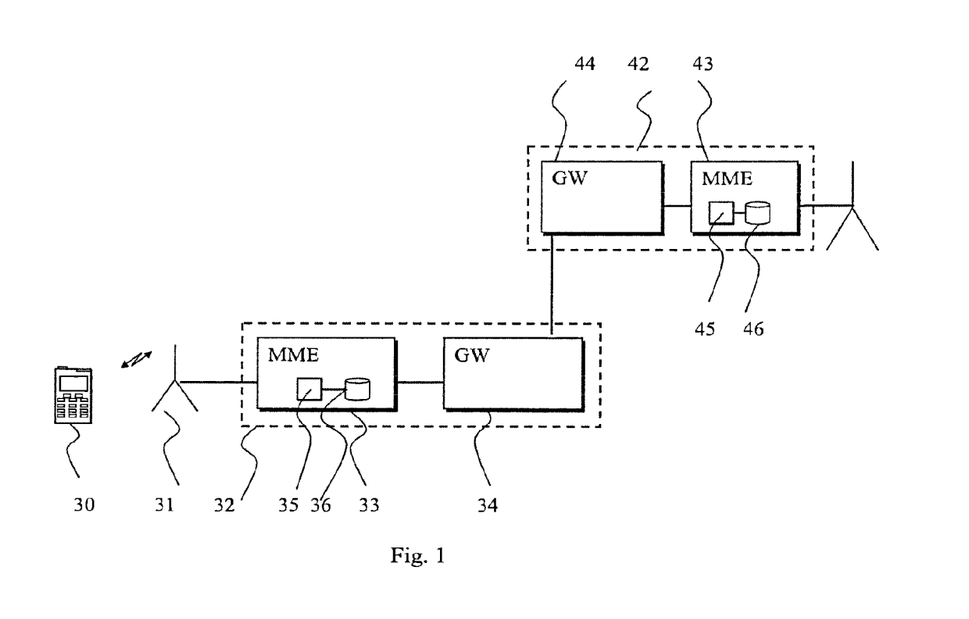
FIG. 1 shows an example of an arrangement in which the embodiments may be implemented.

A reference is first made to FIG. 1 showing schematically two mobile communication networks 32 and 42. A communication device 30, referred to in the following as the user equipment, is in wireless communications with a base station 31 of the network 32. The user equipment is roaming in the network 32, i.e. only visiting network 32, while it is a subscriber to the network 42. Hence the network 42 is referred to below as the home network. Each the visited and the home network is provided with an appropriate mobility management entity 33 and 43, respectively. The networks are connected via appropriate gateway nodes 34 and 44. It is understood that a mobile network may comprise also other elements, such as various controller and signalling nodes than those shown. These, however, are not shown for clarity.

The mobility management entities 33 and 43 are provided with appropriate data processing element 35 and 45 and data storages 36 and 46 for enabling them to perform the operations of the embodiments as described below with reference to FIGS. 2 and 3.

Figure 2:
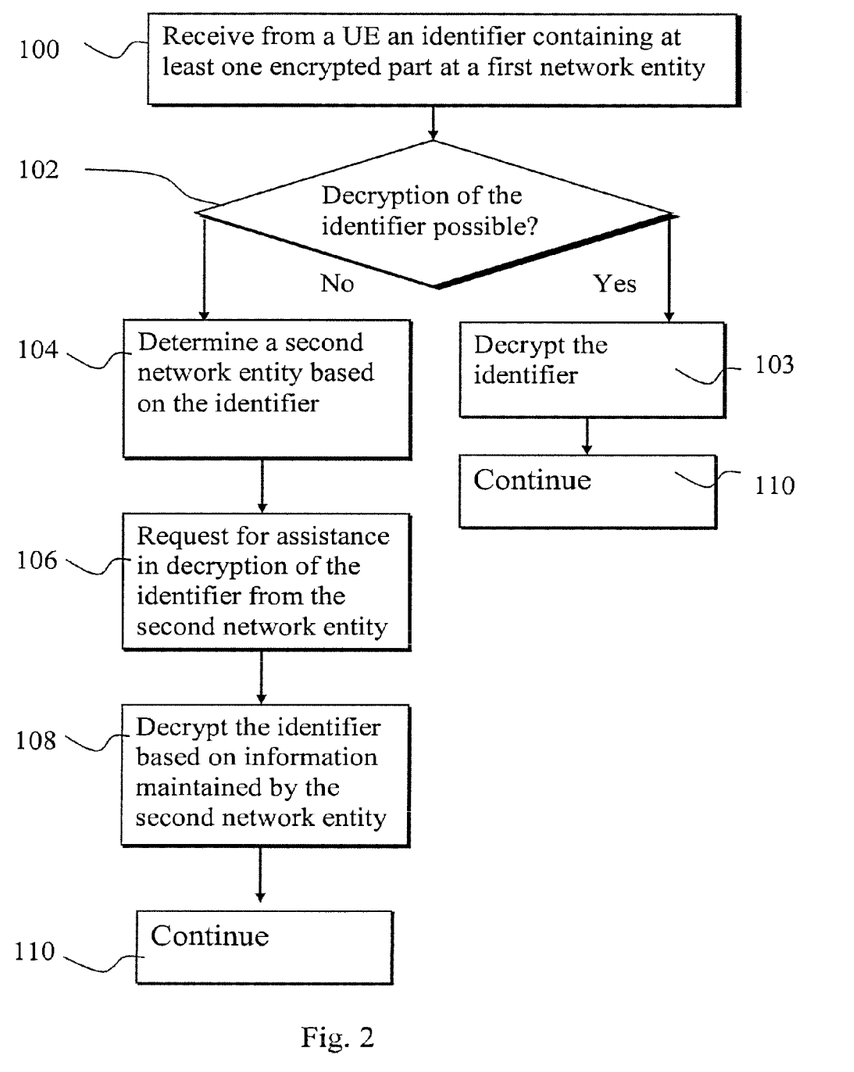
FIGS. 2 and 3 are flowcharts illustrating certain embodiments.

FIG. 2 illustrates a method that may be performed at an entity of the visited network, for example at the mobile management entity (MME) 33 of FIG. 1. At step 100 a network entity receives an identifier containing at least one encrypted part from a user equipment. If it is detected by a data processing capability of the entity at step 102 that the entity is capable of decrypting the identifier, it is then decrypted at step 103. An intended operation, for example an authentication procedure, then follows at step 110.

However, it can be detected that decryption is not possible. The network entity may then determine, at 104, necessary details of a second network entity that maintains information that is needed in the decryption. In FIG. 1 the second entity would be the MME 43 of the home network 42. The determination may be based on information the entity can gather from the identifier that was received from the user equipment at 100.

The first entity can then ask for assistance at step 106 from the second entity. A processor of the second or home entity may then decrypt the message based on information stored in a data storage thereof and return the identifier in decrypted format to the requesting entity.

Alternatively, the home entity only sends back information that is required in the decryption by the requesting entity at step 108. Once the requesting entity is in the possession of the identifier in decrypted format, the user equipment is served by the visited network at 110 in usual manner.

Figure 3:
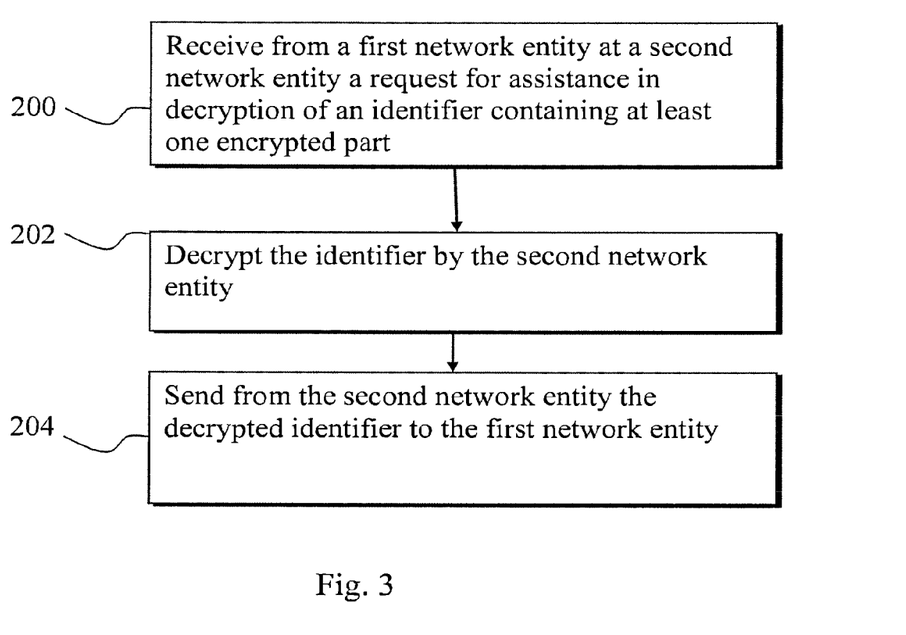

FIG. 3 illustrates an example for operation at an entity that maintains information enabling decryption of encrypted identifiers of a particular user equipment. In FIG. 1 this entity would equal the MME 43 of the home network 42. The entity receives a request for assistance in decryption of the identifier at step 200. Since it possesses the required details for decryption, for example this information is stored in a memory thereof, and the request comes from a trusted entity (such as the MME 32 of FIG. 1), a processor of the entity decrypts the identifier at 202. The decrypted identifier is then sent in clear format to the requestor at 204 for use e.g. in authentication of a visiting user equipment. Alternatively, it is possible to send back only information that could then be used by the requesting entity to decrypt the identifier.

Figure 4:
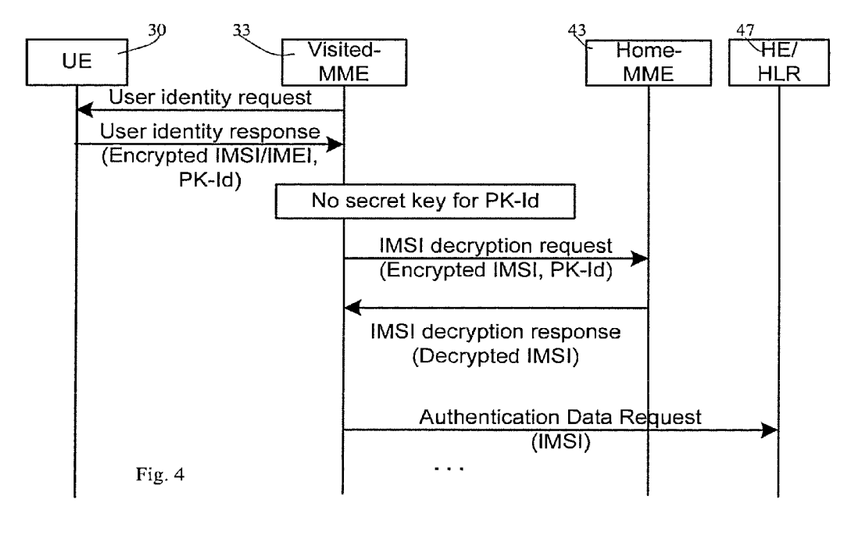
FIGS. 4 to 6 are signaling flowcharts illustrating certain embodiments.
Figure 5:
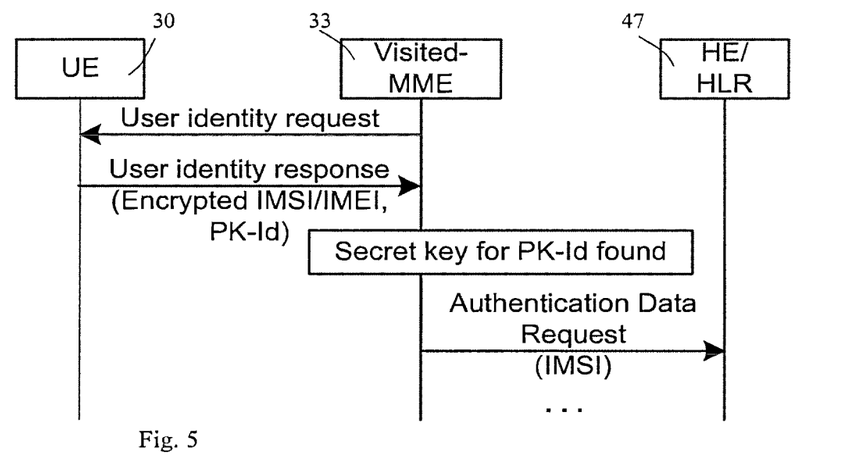

A possible messaging procedure in accordance with an embodiment is shown in detail in the flowcharts of FIGS. 4 and 5. In here a user equipment indicates its willingness to use communication services provided by a network. The MME of the network then sends a message 1 to the user equipment to request for a user identity. This message may be triggered, for example, because the MME has not allocated any temporary mobile subscriber identity (TMSI) to the user equipment.

The user equipment responds by returning a message 2 including an IMSI and IMEI associated with the user equipment. Other information, such as information about public key identifiers may also be included in the response. The user equipment sends at least a part of the identifiers encrypted. For example, at least the mobile subscriber identification number (MSIN) part of the IMSI may be transmitted as encrypted over the air interface.

If the MME detects that the user is a non-roaming user, or that it has otherwise the required details for decryption, then the MME itself can decrypt the MSIN part. For example, the MME may decrypt the encrypted part based on a secret key stored therein. This possibility is shown in FIG. 5.

However, the mobile management entity may realise that the user equipment is a roaming user equipment, and/or that it does not posses enough information to decrypt the encrypted portions of the IMSI identifier. The mobile management entity can nevertheless determine the home network of the user equipment sending message 2 based on information available to it and request for assistance in the decryption by contacting the home operator mobile management entity by means of message 3. In accordance with an embodiment the visited mobile management entity asks the home mobile management entity to decrypt the IMSI on its behalf. This relieves the visited mobile management entity from the burden of storing or obtaining details about the secret keys of other operators.

The legacy interfaces between the entities involved may be used as such. For example, there is no need for any changes in the interfaces between various nodes such as the mobile management entities/signalling GPRS support nodes (MME/SGSN) and home location registers/home subscriber servers (HLR/HSS) of the networks. The required interfaces are controlled and run by the network operators and well protected from outsiders than the air, thus offering a secure channel for communication of sensitive information between the network entities.

The visited mobile management entity may resolve the necessary details of the home mobile management entity by analysing a network specific information part of message 2. For example, the visited mobile management entity may analyse the mobile country code (MCC) and/or mobile network code (MNC) of the IMSI to see if it is acting as a visited mobile management entity or the home mobile management entity for the user equipment, and if not, which network it should contact for help.

In response to message 3 the home mobile management entity can then decrypt the MSIN part and send the IMSI in a clear text format back in message 4 to the visited mobile management entity. The visited mobile management entity (MME) may then continue the intended operation, for example by sending a request for authentication data in message 5 to an appropriate register maintaining subscriber data.

In certain embodiments a valid public key and secret key pair along with a key identifier may be sent in message 4 to the requesting mobile management entity. The public key and secret key pairs are identified so that the correct secret key can be used to decrypt the IMSI. In this option the user equipment provides public key identifier along with the encrypted IMSI (e.g. similar to the key set identifier, KSI). This public key identifier is not specific to the particular user equipment. Other information such as information related to validity periods, possibly associated with operator identities, may also be provided in message 4.

In accordance with an embodiment the public key and secret key pairs are provided with an identifier. The user equipment may then send the identifier with the encrypted IMSI to the visited mobile management entity, and the decryption can be accomplished on these basis. These public key and secret key pairs can be operator specific. For example, these can be specific for a given MCC and MNC. The visited mobile management entity may be provided with this information at an appropriate stage, for example in response to detection that the user equipment has entered the network. Key identifiers can be provided always together with the keys to mobile management entities.

Figure 6:
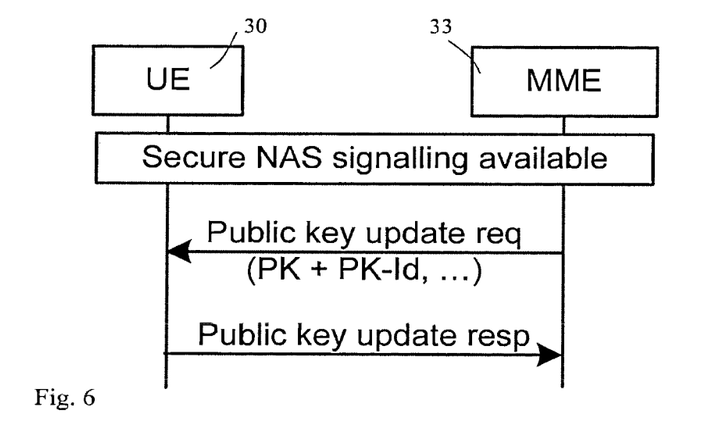

It is also possible to update at lest part of the key information at the user equipment. The general principle of updating the user equipment in this regard is shown in FIG. 6.

A possibility to enhance protection of the identifier is to allow the user equipment to send the IMSI to the network only as long as the user equipment does not have a valid public key with a valid validity period (e.g. non-expired lifetime). A validly authenticated network can then update the user equipment with a valid new public key, key identifier and other information with a validity period.

Updating the public key can also be based on a higher layer protocol or application for remote management of a user equipment. A user equipment may authenticate the network (AUTN parameter) based on an authentication and key agreement (AKA). Thus the user equipment can accept public key update requests from the network after the network has been authenticated and when the communication channel is at least integrity protected. This may provide a viable solution to provide a public key from a mobile management entity to a user equipment.

Certain communication standards do not necessarily distinguish between visited and home networks in all occasions, for example in the context of authentication and key agreement (AKA) procedures. Thus a user equipment may not be able to verify if it is communicating securely with its home network or with some other network. In accordance with an embodiment the user equipment can accept new keys along with identifiers from the home network after it has been authenticated with the AKA procedure and with quintets that are marked to be used only in the home network. For example, the user equipment can use this information to verify that the network it is attached to is really a home network. These public keys belong to the same MCC and MNC as the user equipment's IMSI. A solution to this is to use an authentication management field (AMF) in AKA, to mark the generated quintets to be used only within the home network. By means of this it is possible to ensure that the marked quintets are not delivered out of the home network. This way the user equipment can verify if a network can be trusted to update the keys in the user equipment, as it only receives keys from a network that has been authenticated with a quintet that has "H(ome)" bit set in the AMF field.

A yet further possibility for decrypting the IMSI is that the MME uses the encrypted IMSI when contacting a home HLR/HSS. The HLR may be provided with the corresponding secret key to decrypt the IMSI. This may, however, in certain situations have the drawback that the MME may not be able to select the correct HLR/HSS because the MSIN is decrypted in case the MSIN is used to select the HLR.

Key revocation may not be needed if the used public keys have a validity period. After the lifetime expires the public key is considered to be invalid and user equipment may delete it. It is possible for the network to provide, after the authentication, information about revoked keys and new keys to the user equipment if key revocation procedure is seen necessary.

One option is to pre-configure the public key into the user equipment (e.g. in the xSIM or in the phone memory) with an appropriate mechanism. For example, a public key can be configured when the subscription is purchased. It is not crucial how the public key is configured into the terminal as long as the terminal can answer network enquiries with an encrypted IMSI and be sure that the used public key is valid and that the network has a mechanism to decrypt the IMSI.

The required data processing functions in various entities may be provided by means of one or more data processors. An appropriately adapted computer program code product may be used for implementing the embodiments, when loaded to a computing device comprising such a processor. The program code product for providing the operation may be stored on and provided by means of a carrier medium such as a carrier disc, card or tape. A possibility is to download the program code product via a data network. Implementation may be provided with appropriate executable codes in the processor provided in the network entities, such as in the processors 35 and 45 of FIG. 1 and in a processor of a mobile communication device.

Existing algorithms and interfaces that are used to select HLR/HSS can be used in the embodiments since the visited MME can be provided with a decrypted IMSI by the home MME. Certain embodiments may mitigate the threat of IMSI catching attack as the user equipment does not have to respond with a plain IMSI if it has a valid public key. If the user equipment does not have a valid public key it can use plain text IMSI to identify itself to the network. However, when the network has been authenticated, the user equipment gets a valid public key if it supports the usage of public keys. Certain embodiments enable update of the public keys in the user equipment.

Whilst embodiments of the present invention have been described in relation to communication devises such as mobile user equipments, embodiments of the present invention are applicable to any other suitable type of communication devices.

It is also noted herein that while the above describes exemplifying embodiments of the invention, there are several variations and modifications which may be made to the disclosed solution without departing from the scope of the present invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A method comprising:
   receiving an identifier containing at least one encrypted part at a first network entity from a communication device only when the communication device does not have a valid decryption identifier with a valid validity period;
   determining a second network entity based on the identifier;
   requesting assistance in decryption of the identifier by the second network entity configured as a mobility arrangement entity comprising memory and a processor of the first network entity from the second network entity;
   receiving from the second network entity a decrypted identifier and a decryption identifier based at least in part on a determination by the second network entity based on information stored in a data storage of the second network entity; and
   authenticating the communication device to enable two-way communication based on the identifier to enable mobile communication between parties.

2. The method of claim 1, wherein the decryption identifier comprises at least one of a public key, a secret key, and a key identifier.

3. The method of claim 2, wherein the key identifier comprises one of an international mobile subscriber identity and an international mobile equipment identity.

4. The method of claim 1, wherein the first network entity is part of a roaming network and the second network entity is part of a subscriber's network.

5. The method of claim 4, wherein the identifier containing at least one encrypted part is received from a subscriber.

6. The method of claim 1, further comprising storing in a data storage the at least one of the decrypted identifier and the decryption identifier.

7. The method of claim 1, wherein the first network entity determines the second network entity by analyzing at least ore of network specific information, a mobile country code, and a mobile network code.

8. The method of claim 2, wherein the public key, the secret key, and the key identifier are operator specific.

* * * * *

UNITED STATES PATENT AND TRADEMARK OFFICE
CERTIFICATE OF CORRECTION

PATENT NO.        : 9,344,881 B2
APPLICATION NO.   : 13/615390
DATED             : May 17, 2016
INVENTOR(S)       : Forsberg et al.

Page 1 of 1

It is certified that error appears in the above-identified patent and that said Letters Patent is hereby corrected as shown below:

On the title page item (73), should read:

(73)   Assignee:   Vringo Infrastructure Inc., New York, NY (US)

Signed and Sealed this
Twenty-eighth Day of June, 2016

Michelle K. Lee
*Director of the United States Patent and Trademark Office*